Patented Feb. 27, 1945

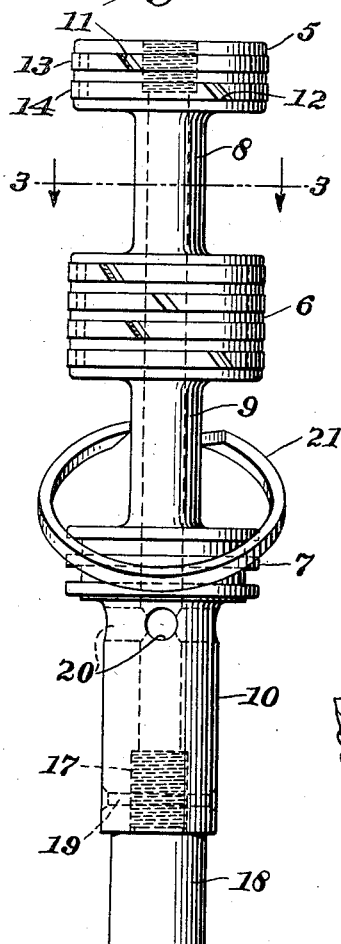
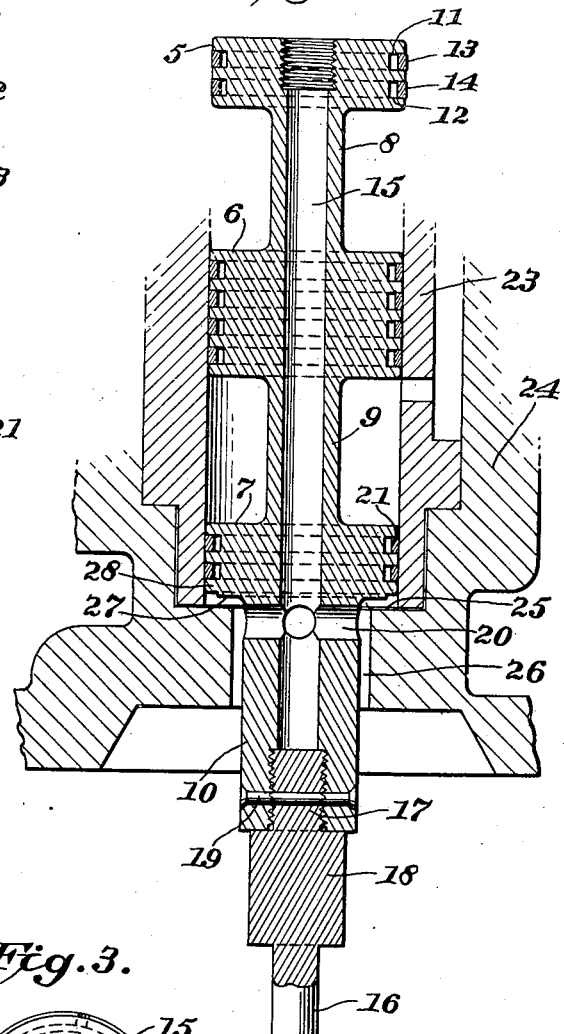
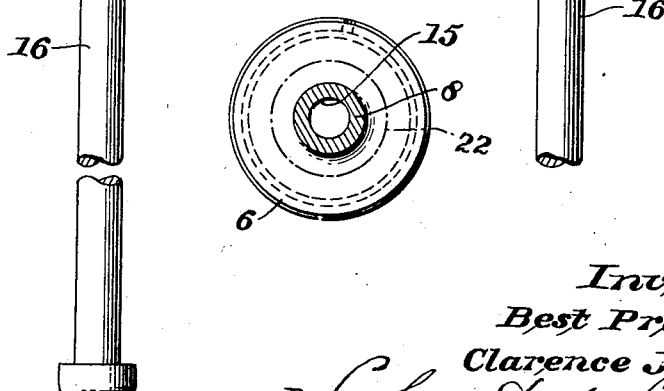

2,370,371

UNITED STATES PATENT OFFICE 2,370,371

VALVE PISTON

Best Pratt and Clarence J. Smith, Chicago, Ill., assignors to Brake Equipment & Supply Co., Chicago, Ill., a corporation of Illinois Application August 19, 1943, Serial No. 499,278

4 Claims. (Cl. 309—4)

This invention relates to valve pistons such, for example, as are used in reversing valve assemblies and which have piston heads grooved for the reception of split compression rings. An object of the invention is to provide such a piston designed to facilitate the assembly of the rings therewith.

Such pistons as ordinarily designed heretofore comprise a shaft on which a plurality of piston heads are carried in spaced relation and the shaft has an axial bore through which extends an operating rod which is clamped to the ends of the valve body. In order to equalize the pressures at the opposite ends of the valve body, the bore, except at its ends, is made substantially larger than the rod so as to provide a longitudinal passage, and ports are connected into this enlarged bore portion from the opposite ends of the body. The presence of the enlarged bore portion requires that the shaft sections between the piston heads be of considerable diameter if they are to be adequately strong.

In assembling the rings with an intermediate piston head, for example, they either have to be sprung over the end piston heads up to the intermediate head or else they have to be spring over a shaft section adjacent the intermediate head. Both practices result in considerable breakage or permanent distortion of the rings and the first practice, in particular, takes considerable time. However, it has ordinarily been resorted to for the reason that the large diameter shaft sections between the piston heads renders the second procedure impractical, from a loss standpoint, if possible at all.

In accordance with the present invention, the valve body is provided with a longitudinal bore for the sole purpose of pressure equalization and the operating rod is united with the valve body by means of a joint confined to one end of the latter. Since thus the bore need only be of sufficient capacity for pressure equalization, it can be of such small diameter as to enable the shaft sections between the piston heads, while still adequately strong, to be of such small outer diameter as to enable the rings to be sprung thereover without being spread to such an extent as to cause breakage or permanent distortion.

The invention is shown by way of example in specific embodiment in the accompanying drawing, in which:

Figure 1 is an elevation of a piston in accordance with the invention showing a ring in process of assembly.

Figure 2 is an axial section of the piston of Figure 1 and of a portion of associated parts, and Figure 3 is a section on line 3—3 of Figure 1.

Referring to the drawing, reference numerals 5, 6 and 7 designate spaced apart aligned piston heads on a shaft which includes portions 8 and 9 intermediate the piston heads and an extension 10 beyond the head 7. The head 5 is provided with grooves 11 and 12 for the reception of split rings 13 and 14. The intermediate head has three ring grooves and the head 7 has two, as here shown. A longitudinal bore 15 extends throughout the shaft and is threaded at its ends as most clearly appears in Figure 2.

An operating rod 16 has a portion 17 threaded into the outer end of the extension 10 and a collar 18 in abutment with the extremity of the extension. Portions 19 and 17 are maintained against loosening by a rivet 19 passed therethrough. The lower end of the bore 15 is thus completely closed and in order to place the passage 15 in communication with atmosphere below head 7, the extension 10 is provided between the head and the inner extremity of rod portion 17 with a number of radial openings 20 whose total capacity is at least equal to that of bore 15.

Since bore 15 does not have to accommodate a rod extending therethrough, it can be made of relatively small diameter and still suffice for the purpose of pressure equalization. This being so, the outer diameter of shaft sections 8 and 9 can be correspondingly smaller, and much smaller than heretofore possible, with the shaft sections still adequately strong to withstand operating stresses. The diameter of the shaft sections is such that split rings as at 21, Figure 1, can be sprung thereover without danger of breakage or permanent distortion, and then can be readily sprung into a groove of an adjacent piston head. Of course, the larger the diameter of the heads and rings the larger can be the diameter of the intermediate shaft sections. The drawing shows a satisfactory relationship substantially to scale, the diameter of the intermediate shaft sections being in the neighborhood of a third that of the piston heads. As a matter of comparison, Figure 3 shows a circle 22 having the diameter of the usual intermediate shaft section and demonstrates the very material decrease in diameter made possible by the present invention.

In Figure 2 the valve body is shown as working in a sleeve or cylinder 23 set in a recess in a block 24, the latter having an annular shoulder 25 below the sleeve projecting inwardly of the latter at the top of an opening 26. The extension 10 is of greater diameter than the shaft sections 8 and 9, but of less diameter than the head 7 so that a substantial clearance is present between the extension and the wall of opening 26 for the free flow of air to and from the openings 20. The bottom of head 7 is provided with an annular shoulder 27 which, upon overtravel of the piston downwardly, will abut shoulder 25 and thereby prevent distortion of the bottom flange 28 of the head which would result in seizing of the bottom piston ring. The diameter of extension 10 is sufficient to allow for the presence of the several perforations 20 without unduly weakening the extension.

Where the upper end of sleeve 23 is closed by a removable cap, the valve can be readily removed upwardly, upon removal of the cap, by merely threading a bolt in the upper threaded end of bore 15 and then lifting on the bolt.

The invention is not limited to the specific disclosure herein, but extends to such variations in the form and arrangement of parts as come within the terms of the following claims.

We claim:

1. A valve piston comprising a valve body including a shaft having a longitudinal bore throughout and a plurality of spaced apart piston heads on said shaft provided with ring grooves, the distance apart of said heads being greater than the width of a ring groove, said shaft including a portion extending outwardly beyond one of the end piston heads, a rod fixed to the outer end of said extending portion and projecting a short distance within said bore and closing the same, said valve body having an opening to said bore at the outer end of said end piston head, said opening joining said bore inwardly of the inner end of said rod so that a passage is provided between the outer ends of the end piston heads, said bore being of such small diameter between the piston heads as to enable the shaft between the piston heads to be of such small outside diameter, while providing adequate strength, as to permit split rings to be sprung thereover for association with the piston heads without being spread to an extent to cause breakage or permanent distortion of said rings.

2. A valve piston comprising a valve body including a shaft having a longitudinal bore throughout and a plurality of spaced apart piston heads on said shaft provided with ring grooves, the distance apart of said heads being greater than the width of a ring groove, said shaft including a portion extending outwardly beyond one of the end piston heads, a rod fixed to the outer end of said extending portion and projecting a short distance within said bore and closing the same, said extending portion having a side opening therein joining said bore inwardly of the inner end of said rod so that a passage is provided between the outer ends of said pistons, said bore being of such small diameter between the piston heads as to enable the shaft between the piston heads to be of such small outside diameter, while providing adequate strength, as to permit split rings to be sprung thereover for association with the piston heads without being spread to an extent to cause breakage or permanent distortion of said rings.

3. A valve piston comprising a valve body including a shaft having a longitudinal bore throughout and a plurality of spaced apart piston heads on said shaft provided with ring grooves, the distance apart of said heads being greater than the width of a ring groove, said shaft including a portion extending outwardly beyond one of the end piston heads, a rod fixed to the outer end of said extending portion and projecting a short distance within said bore and closing the same, said valve body having an opening to said bore at the outer end of said end piston head, said opening joining said bore inwardly of the inner end of said rod so that a passage is provided between the outer ends of the end piston heads, said bore being of such small diameter between the piston heads as to enable the shaft between the piston heads to be of such small outside diameter, while providing adequate strength, as to permit split rings to be sprung thereover for association with the piston heads without being spread to an extent to cause breakage or permanent distortion of said rings, said extending portion of said shaft being of greater diameter than the shaft between said piston heads but of smaller diameter than the adjacent piston head.

4. A valve piston comprising a valve body including a shaft having a longitudinal bore throughout and a plurality of spaced apart piston heads on said shaft provided with ring grooves, the distance apart of said heads being greater than the width of a ring groove, said shaft including a portion extending outwardly beyond one of the end piston heads, a rod fixed to the outer end of said extending portion and projecting a short distance within said bore and closing the same, said extending portion having a side opening therein joining said bore inwardly of the inner end of said rod so that a passage is provided between the outer ends of said pistons, said bore being of such small diameter between the piston heads as to enable the shaft between the piston heads to be of such small outside diameter, while providing adequate strength, as to permit split rings to be sprung thereover for association with the piston heads without being spread to an extent to cause breakage or permanent distortion of said rings, said extending portion of said shaft being of greater diameter than the shaft between said piston heads but of smaller diameter than the adjacent piston head.

BEST PRATT.
CLARENCE J. SMITH.